Figure 1:
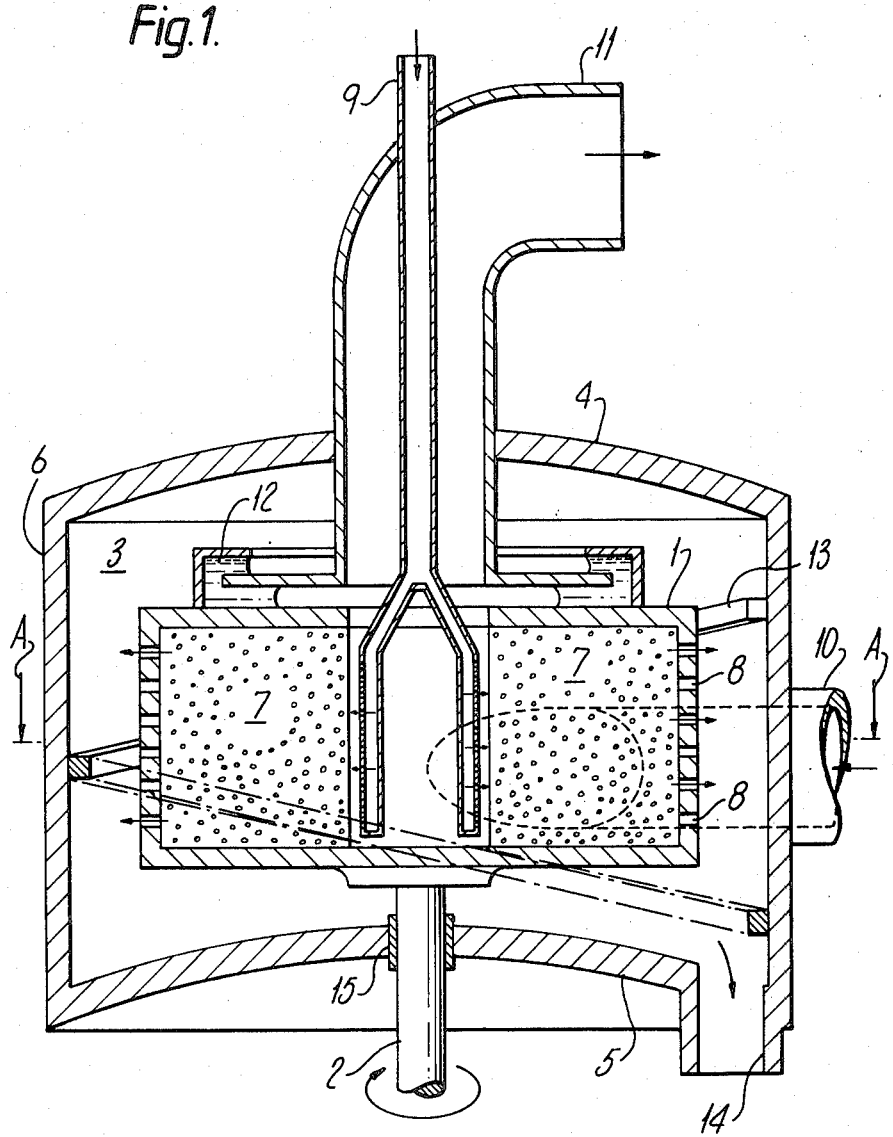

United States Patent [19]

Wem

[11] 4,382,045
[45] May 3, 1983

[54] CENTRIFUGAL GAS-LIQUID CONTACT APPARATUS

[75] Inventor: James W. Wem, Cleveland, England

[73] Assignee: Imperial Chemical Industries PLC, London, England

[21] Appl. No.: 293,959

[22] Filed: Aug. 18, 1981

[30] Foreign Application Priority Data

Sep. 11, 1980 [GB] United Kingdom ............... 8029394

[51] Int. Cl.³ .............................................. B01F 3/04
[52] U.S. Cl. .................................. 261/89; 261/79 A; 261/97; 366/102
[58] Field of Search ....................... 261/88–90, 261/79 A, 94–98; 159/13 A; 366/102

[56] References Cited

U.S. PATENT DOCUMENTS

| | | | |
|---|---|---|---|
| 3,348,830 | 10/1967 | Pearl et al. | 261/79 A X |
| 3,415,501 | 12/1968 | Pilo | 261/89 |
| 3,620,509 | 11/1971 | Roman | 261/79 A X |
| 3,714,764 | 2/1973 | Gething | 261/79 A X |
| 3,969,093 | 7/1976 | Murray, Jr. | 261/79 A X |
| 3,990,870 | 11/1976 | Miczek | 261/79 A X |
| 4,094,734 | 6/1978 | Henderson | 159/13 A |
| 4,297,111 | 10/1981 | Ross | 261/89 X |

FOREIGN PATENT DOCUMENTS 1114784 4/1962 Fed. Rep. of Germany .

Primary Examiner—Richard L. Chiesa

[57] ABSTRACT

In centrifugal apparatus for gas-liquid contacting, liquid discharged from the rotor into a surrounding chamber is led from the chamber by guide means on the chamber wall.

2 Claims, 2 Drawing Figures

CENTRIFUGAL GAS-LIQUID CONTACT APPARATUS

This invention is concerned with centrifugal gas-liquid contact apparatus. Throughout this patent specification, the word "gas" is intended to include also vapours.

Various centrifugal devices for gas-liquid contacting have been proposed, including that described in UK Pat. No. 757,149 of Claes Wilhelm Pilo. More recently, we have ourselves described in European Patent Publication No. 0,002,568 a centrifugal gas-liquid contact apparatus having a permeable element of large interfacial area. The emphasis in such prior devices has been on improving the efficacy of the gas-liquid contacting. While such improved contacting is indeed important, there are other problems arising in the practical carrying out of that contacting in apparatus operating on a commercial scale.

In such centrifugal devices, contacting of gas and liquid takes place within the rotor and the liquid is thereafter discharged from the rotor into a chamber within which the rotor rotates. For efficient operation of such apparatus, it is desirable that the liquid be withdrawn from the chamber without undue delay, in order to use the capacity of the apparatus to maximum benefit. Furthermore, build-up of liquid in the chamber can give rise to viscous drag on the rotor and a consequential loss of efficiency in operation of the apparatus. However, the liquid is discharged at high speed from the rotor with a component of motion tangential to the direction of rotation of the rotor and this motion must be to some extent spent before the liquid can readily drain from the chamber.

It is an object of this invention to reduce or overcome the tendency of discharged liquid to remain in the chamber.

This object is achieved by the provision of liquid guide means on the chamber wall.

Gas-liquid contact apparatus according to the present invention, which comprises a rotor mounted for rotation within a chamber and wherein liquid is discharged from said rotor into said chamber, is characterised by liquid guide means on the chamber wall.

The function of the liquid guide means is to divert liquid towards an outlet from the chamber. The guide means may be formed integral with the chamber wall, for example as one or more channels in, or projections upon, the wall, or may be separately formed and subsequently mounted upon the wall. For example, flat or curved baffles may be mounted upon the wall and so disposed as to divert liquid from a largely circumferential path in the chamber towards a suitable liquid outlet.

Advantageously, the liquid guide means may take the form of one or more curved projections mounted upon the chamber wall, for example welded thereto. In a preferred form, the liquid guide means may be one or more curved projections, continuous or interrupted, of essentially spiral shape. Particularly preferred is a continuous, single-start, single-turn spiral projection.

The invention is illustrated in the accompanying drawings, in which

Figure 2:
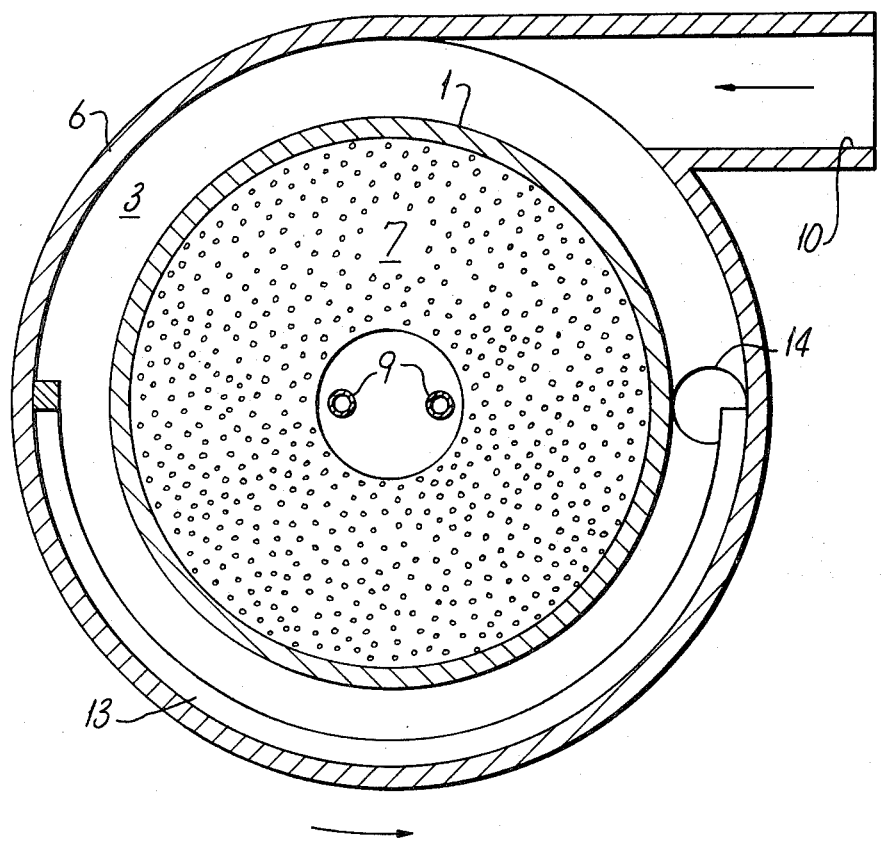

FIG. 1 is a vertical sectional view of a gas-liquid contact apparatus according to the present invention; and FIG. 2 is a horizontal sectional view on the line A—A of FIG. 1.

Referring to the drawings, a rotor, designated generally by the numeral 1, is mounted upon a drive shaft 2, by means of which it is rotated within a chamber 3 defined by cover 4, base 5 and a cylindrical side wall 6. Where the shaft 2 passes through the base 5, a conventional mechanical seal 15 is provided. Rotor 1 carries a permeable packing 7, disposed symmetrically as an annulus about the axis of rotation of the rotor. In the drawings, the packing 7 has been shown diagrammatically with perforations but in practice the packing may be microporous or otherwise permeable such that the pores would not be visible on the illustrated scale. For example, the packing may be in the form of a metallic skeletal foam or of a mass of interwoven fibres.

The cylindrical outer wall of the rotor 1 is provided with apertures 8 for the passage of liquid and/or gas. For example, larger apertures for admission of gas to the rotor may be interspersed with smaller apertures for discharge of liquid from the rotor.

In operation of the illustrated apparatus, liquid is introduced via feed pipe 9 and, via apertures in the lower end of the feed pipe, is directed on to the rotating inner surface of the packing 7. The rotation of the rotor 1 subjects the liquid to a high acceleration in an outward direction and the liquid permeates rapidly through the packing 7 and subsequently is discharged through the apertures 8 into the chamber 3.

Gas is introduced tangentially into the chamber 3 via feed pipe 10 and passes under pressure through the apertures 8 into the packing 7. The gas permeates the packing counter-current to the outward flow of liquid and subsequently emerges at the radially inner face of the packing, whence it leaves the apparatus via gas discharge pipe 11. By-passing of the packing 7 by the gas (that is, direct flow of the gas from feed pipe 10 to discharge pipe 11) is prevented by means of a liquid seal 12, mounted for rotation upon the rotor 1.

The apparatus is illustrated as operating with the rotor 1 rotating in a counter-clockwise direction (as viewed from above as in FIG. 2). Liquid emerging from apertures 8 is flung on to the inner face of chamber wall 6 in a direction having a component tangential to the circumference of the rotor. In the absence of the feature which characterises our invention, the liquid would therefore flow circumferentially around the chamber wall in a counter-clockwise direction. This circumferential flow is to some extent reinforced by the inward flow of gas and tends to delay discharge of liquid from the chamber 3 and thereby reduce the effective capacity of the apparatus.

The apparatus has, however, a continuous projection 13 on the inner face of chamber wall 6. This projection is in the form of a single-start, single-turn spiral attached to the wall 6. (In FIG. 1, the lower half of the spiral 13, which strictly should not be shown in this sectional view, is designated by dotted lines to aid understanding of its disposition). The direction of turn of the spiral relative to the direction of rotation of the rotor is such that liquid impinging upon the chamber wall is diverted by the projection 13 generally downwardly towards a liquid discharge pipe 14, by means of which it is removed from the chamber 3.

Thus, by means of the feature which characterises our invention, liquid "hold-up" in the chamber is substantially reduced.

I claim:

1. A centrifugal gas-liquid contact apparatus comprising:

a hollow cylindrical rotor rotatable about an axis, and having a cylindrical outer peripheral sidewall having means defining a plurality of axially and angularly distributed gas inlet/liquid outlet apertures therethrough, for the inward passage of gas and outward passage of liquid, a first end wall, and a second end wall having means defining a central aperture therethrough;

a shaft operatively connected coaxially to the rotor at said first end wall so that rotation of the shaft produces corresponding rotation of the rotor;

a liquid feed pipe projecting axially into the rotor through said central aperture and, within the rotor having means defining a plurality of apertures through which liquid supplied to the feed pipe may be introduced to the interior of the rotor;

an annular mass of gas/liquid contact surfaces occupying the interior of the rotor in obscuring relation between said apertures of the liquid feed pipe and said apertures of the rotor outer peripheral sidewall;

a stationary gas discharge pipe coaxially communicated to said central aperture of said rotor second end wall in spacedly surrounding relation to said liquid feed pipe and via means providing a gastight, rotation-permitting interfacial seal between said rotor and said stationary gas discharge pipe;

wall means defining a cylindrical chamber spacedly enclosing said rotor and including a first end wall, a second end wall and a cylindrical sidewall;

means defining a liquid outlet conduit from said cylindrical chamber;

means defining a gas inlet conduit through said chamber sidewall, having an open end aimed tangentially of said chamber cylindrical sidewall towards said rotor cylindrical sidewall; and liquid guide means disposed on the interior of said chamber cylindrical sidewall in a spiral having at least one turn about the chamber cylindrical sidewall, and disposed to deflect liquid, which issues out of the hollow cylindrical rotor and against the interior of said cylindrical sidewall with an angular component of motion, more directly towards said liquid outlet conduit than said liquid would flow towards said liquid outlet conduit in the absence of such deflection.

2. A centrifugal gas-liquid contact apparatus comprising:

a hollow cylindrical rotor having a generally vertical axis, a cylindrical outer peripheral sidewall having means defining a plurality of axially and angularly distributed gas inlet/liquid outlet apertures therethrough, for the inward passage of gas and outward passage of liquid, a lower end wall, and an upper end wall having means defining a central aperture therethrough;

a shaft operatively connected coaxially to the rotor at said lower end wall so that rotation of the shaft produces corresponding rotation of the rotor;

a liquid feed pipe projecting axially downwardly into the rotor through said central aperture and, within the rotor having means defining a plurality of apertures through which liquid supplied to the feed pipe may be introduced to the interior of the rotor;

an annular mass of gas/liquid permeable packing occupying the interior of the rotor in obscuring relation between said apertures of the liquid feed pipe and said apertures of the rotor outer peripheral sidewall;

a stationary gas discharge pipe coaxially communicated to said central aperture of said rotor upper end wall in spacedly surrounding relation to said liquid feed pipe and via means providing a gastight, rotation-permitting interfacial seal between said rotor and said stationary gas discharge pipe;

wall means defining a cylindrical chamber spacedly enclosing said rotor and including an upper end wall, a lower end wall and a cylindrical sidewall;

means defining a liquid outlet conduit from said cylindrical chamber, located in the vicinity of where said chamber lower end wall meets said chamber cylindrical sidewall;

means defining a gas inlet conduit through said chamber cylindrical sidewall, having an open end aimed tangentially of said chamber cylindrical sidewall towards said rotor cylindrical sidewall; and liquid guide means disposed on the interior of said chamber cylindrical sidewall in a spiral having at least one turn about the chamber cylindrical sidewall, and disposed to deflect liquid, which issues out of the hollow cylindrical rotor and against the interior of said cylindrical sidewall with an angular component of motion, more directly towards said liquid outlet conduit than said liquid would flow towards said liquid outlet conduit in the absence of such deflection.

* * * * *